United States Patent

[11] 3,624,715

[72] Inventors Paul Holdinghausen
Bickenbach;
Karl Homilius, Nieder-Ramstadt; Alfred J. Giers, Rossdorf, all of Germany
[21] Appl. No. 760,605
[22] Filed Sept. 18, 1968
[45] Patented Nov. 30, 1971
[73] Assignee Carl Schenck Maschinenfabrik G.m.b.H.
Darmstadt, Germany

[54] BALANCING MACHINE FOR SUBCRITICAL OPERATION INDICATING MAGNITUDE AND ANGULAR POSITION OF UNBALANCE MASS
7 Claims, 16 Drawing Figs.

[52] U.S. Cl. ............................................... 73/466
[51] Int. Cl. ............................................... G01m 1/22
[50] Field of Search ............................... 73/462, 466

[56] References Cited
UNITED STATES PATENTS
3,102,429 9/1963 Hardy et al. ................. 73/462

FOREIGN PATENTS
878,638 10/1961 Great Britain ............... 73/462

*Primary Examiner*—James J. Gill
*Attorneys*—Curt M. Avery, Arthur E. Wilfond, Herbert L. Lerner and Daniel J. Tick ABSTRACT: A computer including a logarithmic voltage divider and potentiometer for taking into account the balancing radii is connected to mechanical to electrical transducers at the bearing surfaces of a balancing machine for subcritical operation and functions to separate the balancing planes. A filter amplifier arrangement which is adjustable to the bearing frequency is coupled to the computer and the output of such filter amplifier arrangement is coupled to its input via a feedback path which includes a limit amplifier. An indicator connected to the filter amplifier arrangement has a calibrated amplification degree for frequency selective direct determination of the magnitude of the unbalance mass. A stroboscope connected to the limit amplifier determines the angular position of the unbalance mass.

BALANCING MACHINE FOR SUBCRITICAL OPERATION INDICATING MAGNITUDE AND ANGULAR POSITION OF UNBALANCE MASS

DESCRIPTION OF THE INVENTION

The present invention relates to a balancing machine for subcritical operation. More particularly, the invention relates to a balancing machine for subcritical operation indicating the magnitude and angular position of the unbalance mass. The balancing machine has bearing surfaces and utilizes mechanical to electrical transducers at the bearing surfaces to determine the magnitude and angular position of an unbalance mass in two balancing planes in a single operation.

In so-called soft balancing machines, having a bearing or balancing body which has an angular or rotation frequency higher than the critical angular or rotation frequency of the balancing machine, stroboscopes may be utilized for angular measurement This has the advantage of avoiding mechanical coupling with the rotor in order to determine the angular relationship with the rotor. The only requirements are a number tape or band and a stroboscopic lamp. Upon operation of the stroboscopic lamp, when a number of the number band or tape appears to remain stationary, during rotation of the rotor, the angular position of the unbalance mass is indicated. The angular position of the unbalanced mass is thus determined in a soft balancing machine completely without reaction, so that such a machine has a relatively high signal voltage and a low portion of disturbances in the transducer voltage.

The soft balancing machines, however, have the disadvantage that at least two balancing operations are required in order to determine the sensitivity and in order to separate the planes. This is due to the fact that the sensitivity of the measuring device cannot be calibrated while the machine is stationary. Furthermore, the action of a predetermined unbalance against the measuring device may be established only by a test operation, due to the fact that the sensitivity depends upon the moment of inertia of the bearing or balancing body.

The aforedescribed adjustment method is not required in the so-called hard balancing machines for subcritical operation. This is due to the fact that in hard balancing machines the balancing planes may be adjusted while the machine is stationary by utilizing the geometrical distances of the balancing planes and the bearing planes. Thus, if the balancing radii are taken into account, a hard balancing machine will provide a direct indication of the unbalance mass, even during the first balancing operation.

A disadvantage of the hard balancing machine is that it produces considerably smaller signal voltages compared to soft balancing machines. This is due to the generally low range of operating angular velocity. Furthermore, the signal voltage includes a considerable portion of disturbances, since such disturbances may be greatly increased by the natural resonance of the oscillating system which is above the range of the operating angular velocity.

The greatest requirements for a balancing machine thus relate to frequency selectivity, sensitivity and constancy. It is possible to provide calibrated measuring devices for a balancing machine which permit a direct indication or determination of the magnitude of the unbalance mass by utilizing controlled rectification and power measurement. The angular position indication in this method, however, is produced by electrical measuring apparatus. This requires an angular relationship with the rotor in the form of an electrical voltage or a variation in resistance. This type of measuring process is therefore relatively expensive.

The principal object of the present invention is to provide a new and improved balancing machine.

An object of the present invention is to provide a balancing machine which overcomes the disadvantages of known balancing machines.

An object of the present invention is to provide a balancing machine which is effective, efficient and reliable in operation.

An object of the present invention is to provide a balancing machine which is not expensive in manufacture or operation.

An object of the present invention is to provide a balancing machine which provides an indication of the magnitude and the angular position of the unbalance mass by a stroboscope in a simple manner in a single operation.

In accordance with the present invention, a computer is utilized to separate the balancing planes and preferably includes a logarithmic or exponential voltage divider and potentiometers for taking into account the balancing radii of the balancing planes. A filter amplifier which is adjusted to the bearing frequency is connected to the computer. An indicator having a calibrated amplification degree provides a frequency selective direct determination of the magnitude of the unbalance mass.

The balancing machine of the present invention permits, for the first time, a determination of the magnitude and angular position of the unbalance mass by means of a stroboscope in a single operation and in a simple manner. The advantages which permit the adjustment of the machine while it is stationary are combined with the advantages inherent in the use of a stroboscope to measure the angular position in a new manner. The utilization of a stroboscope for determining the angular position of the unbalance mass eliminates the need for a separate electrical reference signal. A reference signal is derived from the unbalance signals, so that it is possible to determine the angular position of the unbalance mass in correlation with a number band on the rotor.

When oscillating velocity transducers are utilized in the balancing machine, an integrator in included in the computer to eliminate the frequency dependence of such transducers, and a double integrator is utilized to further eliminate the frequency dependence of such transducers. The quadratic dependence of the centrifugal force on the angular velocity is taken into account, via the double integrator, so that the unbalance signal is provided at the output of the indicator independently of the angular velocity. This results in an indication of the angular position of the unbalance mess which is independent of the frequency. Phase displacement occurring in the integrators is compensated by a phase shifter connected in the stroboscope circuit. The indicator provides a direct indication of the magnitude of the unbalance mass and permits a simultaneous indication for both planes, after the measuring operation.

In accordance with the present invention, our balancing machine for subcritical operation having bearing surfaces and mechanical to electrical transducers at the bearing surfaces for determining the magnitude and angular position of an unbalance mass in two balancing planes in a single operation comprises a computer. The computer is connected to the transducers and functions to separate the balancing planes. The computer includes a logarithmic or exponential voltage divider and potentiometers for taking into account the balancing radii of the balancing planes. Filter amplifiers adjustable to the bearing frequency have an input coupled to the computer. A feedback circuit couples the output of the filter amplifiers to the input thereof via a limit amplifier. An indicator circuit connected to the output of the filter amplifiers has a calibrated amplification degree for frequency selective direct determination of the magnitude of the unbalance mass. A stroboscope arrangement is connected to the limit amplifier and determines the angular position of the unbalance mass.

An integrator is included in the computer for eliminating the frequency dependence of the mechanical to electrical transducers when the transducers are of oscillation velocity type. A double integrator is provided for further eliminating the frequency dependence of the transducers. The filter amplifiers are coupled to the computer via the double integrator thereby accounting for the quadratic dependence of the centrifugal force on the angular velocity so that the unbalance indication of the indicator circuit is independent of the angular velocity. A phase shifter is connected between the filter amplifiers and the stroboscope circuit for compensating for phase displacement occurring in the integrator and the double integrator. The stroboscope circuit is utilized to adjust the filter amplifiers to the balancing angular velocity. The computer is adjusted for the geometrical distances between the balancing planes and the bearing planes.

A control device is connected between the filter amplifiers and the indicating circuit for calibrating the filter amplifiers in sensitivity. The indicating circuit includes a pair of memory devices for the magnitude of the unbalance mass for two planes.

In order that the present invention may be readily carried into effect, it will now be described with reference to the accompanying drawing, wherein.

Figure 1:
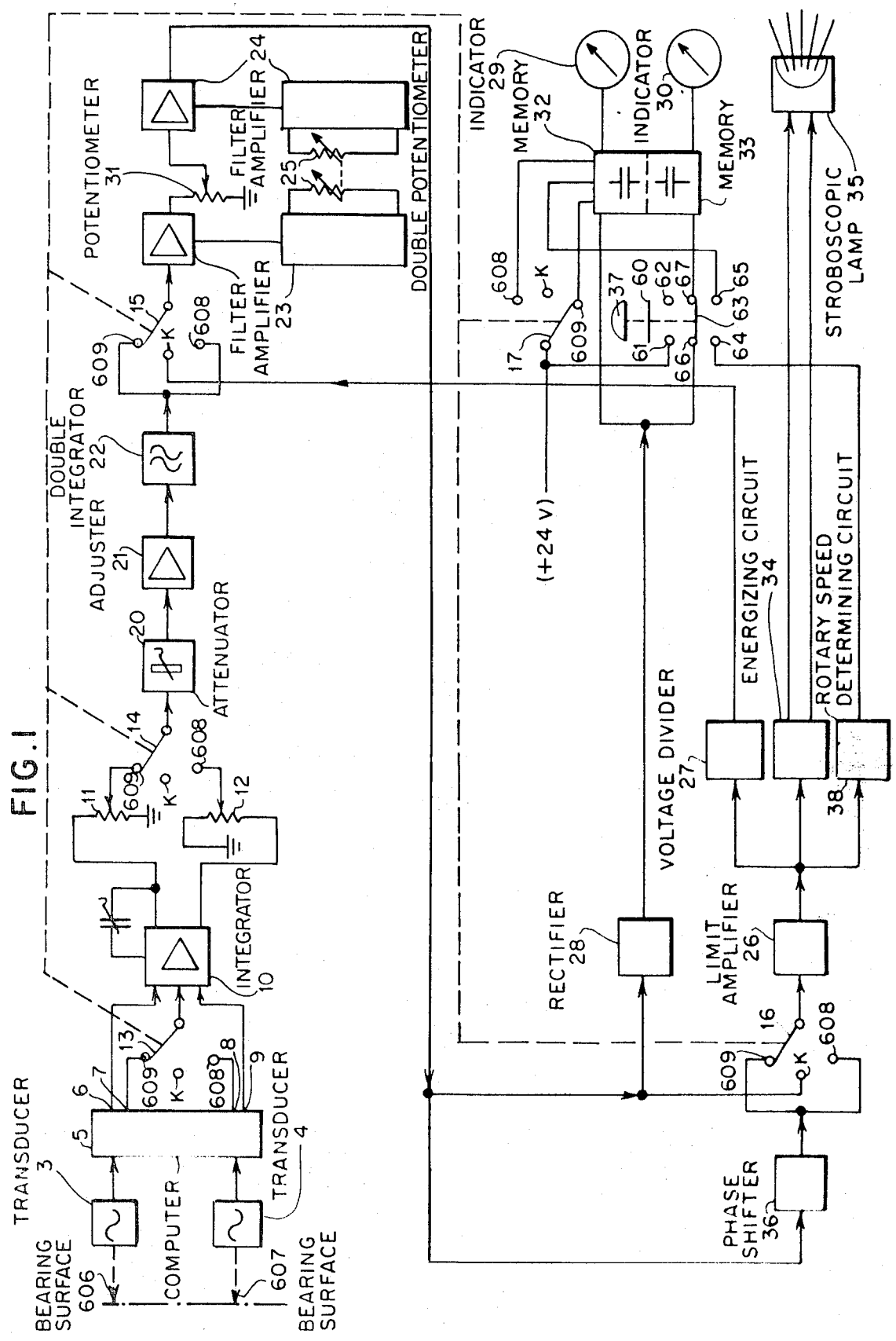
FIG. 1 is a schematic block diagram of an embodiment of the balancing machine of the present invention.
Figure 2:
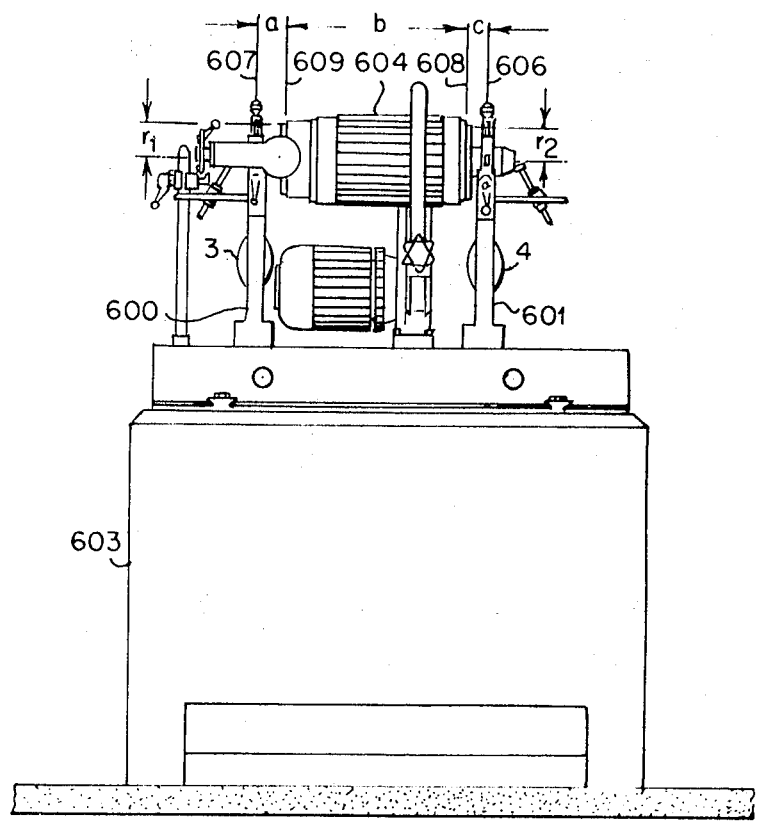
FIG. 2 is a schematic diagram of the balancing machine of the present invention.

In FIG. 1, the forces or oscillations in the bearing surfaces or planes 606 and 607 of a balancing machine, as shown in FIG. 2, are converted into electrical signals by mechanical to electrical transducers 3 and 4. The electrical output signals produced by the transducers 3 and 4 are supplied to the inputs of a computer 5 of which functions to separate the balancing planes. The computer 5 of FIG. 1 converts the voltages provided by the transducers 3 and 4 in such a manner that a voltage is produced at the outputs 6 and 7 of said computer which indicates the unbalance in the balancing plane 609 (FIG. 2) selected for the bearing plane 607 (FIG. 2). The computer 5 provides at its outputs 8 and 9 a voltage which indicates the unbalance in the balancing plane 608 selected for the bearing plane 606.

The computer 5 preferably includes two logarithmic potentiometers and a ring counter for adjusting the distance between one bearing plane and the corresponding balancing plane such as, for example, those on the right, and the distance between the other bearing plane and the corresponding balancing plane such as, for example, those on the left.

The forces occurring at the bearing surfaces of hard balancing machines are proportional to the product of the unbalance mass, the balancing radius and the square of the angular velocity or number of rotations per unit time. If the transducers 3 and 4 are of the oscillation velocity type, the output voltage provided at the outputs 6 and 7 and at the outputs 8 and 9 of the computer 5 is proportional to the product of the unbalance mass $m_u$, the balance radius $r$ and the cube of the angular velocity of the bearing in revolutions per minute. Thus, the output voltage at the outputs 6 and 7 and 8 and 9 is proportional to $(m_u)(r)(n^3)$.

During subsequent switching, it is therefore necessary to divide the output voltage at the outputs 6 and 7 and 8 and 9 by $rn^3$ in order to provide a direct indication of the magnitude of the unbalance mass. An integrator 10 is thus connected to the outputs 6 and 7 and 8 and 9 of the computer 5 and functions to divide by $n$. A potentiometer 11 is connected to one output of the integrator 10 and another potentiometer 12 is connected to the other output of said integrator. The potentiometer 11 is manually adjusted in accordance with the balancing radius for the plane 609$r_1$ and the potentiometer 12 is manually adjusted for the balancing radius for the plane 608$r_2$.

The circuitry connected to the outputs of the potentiometers 11 and 12, which outputs are the slide voltage varying members of said potentiometers, is provided in a single channel embodiment in order to save expense in the construction thereof. More particularly, a three-position mechanical switch or relay is utilized to switch from one plane to the other, thereby switching each plane into the circuit, as desired, without requiring duplication of components in the circuitry connected to the outputs of the potentiometers 11 and 12. A plurality of switches 13, 14, 15, 16 and 17 are provided it various points of the circuit for the foregoing purpose. The switches 13 to 17 are mechanically coupled to each other so that they function as a single unit. More particularly, the switches 13 to 17 may be provided on a common shaft, so that all of said switches are in the same position at any instant of time. Each of the switches 13 to 17 has a central position K and a first end position in which it provides a contact or connection corresponding to the plane 609 and a second end position in which it provides a contact or connection corresponding to the plane 608.

The switch 13 is connected with one end of its switch arm in permanent electrical connection with an input to the integrator 10 and with the other end of its switch arm selectively in engagement with the output 7 of the computer 5, a neutral central position K or the output 8 of the said computer. The switch 14 is connected with one end of its switch arm in permanent electrical connection with the input of an attenuator 20 and the other end of its switch arm in electrical connection with the variable connector of the potentiometer 11, a neutral central position K or the variable connection of the potentiometer 12.

The attenuator 20 functions to vary the sensitivity of the circuit. A division by $n^2$ is provided by an adjuster 21, which is connected to the output of the attenuator 20, and a double integrator 22, which is connected to the output of the adjuster 21. The remaining signal is thus indicative of unbalance mass $m_u$. The multiple integration, due to the operation of the integrator 10 and the double integrator 22, greatly decreases the high frequency disturbing waves or disturbances.

A pair of filter amplifiers 23 and 24, connected to each other in tandem, are connected to the output of the double integrator 22 via the switch 15. The filter amplifiers 23 and 24 are adjusted to the baring frequency or unbalance angular velocity by a double potentiometer 25. The filter amplifiers 23 and 24 provide the desired frequency selectivity.

The output of the filter amplifier 23 is connected to the filter amplifier 24 via a potentiometer 31, which permits readjustment of the amplification degree, if desired. The output of the filter amplifier 24 is connected to the input of a phase shifter 36 and is also connected to the central position K of the switch 16. The phase shifter 36 has a single output which is divided into two outputs, one of which provides one end position contact for the switch 16 and the other of which provides the other end position contact of said switch.

One end of the switch arm of the switch 15 is in permanent electrical connection with the input of the filter amplifier 23. The other end of the switch arm of the switch 15 is in selective electrical contact with the output of the double integrator 22 or the central position K which is electrically connected to the output of a voltage divider 27. The single output of the double integrator 22 is provided as an output to one of the end contact terminals of the switch 15 and as an output to the other of the end contact terminals of said switch. The switch arm of the switch 16 is permanently electrically connected at one end to the input of a limit amplifier 26 and is in selective electrical engagement with its two end contacts corresponding to the output of the phase shifter 36 and its central position K which is electrically connected to the output of the filter amplifier 24.

The output of the filter amplifier 24 is connected to the input of a rectifier 28, the output of which is connected to an indicating circuit. The output of the limit amplifier 26 is connected in common to the input of the voltage divider 27, to the input of an energizing circuit 34 for the stroboscope lamp 35 and to the input of a rotary speed determining circuit 38. The output of the rotary speed determining circuit 38 is connected to the indicating circuit. The switch 17 is connected in the indicating circuit and functions to provide a DC voltage of +24 volts selectively to its two end contacts and its central contact. The central contact K of the switch 17 is a neutral one.

The central position K of the switch 16 is utilized to determine the degree of amplification of the filter amplifiers 23 and 24. When the switch arm of the switch 16 is electrically connected to its central position K, the output voltage of the filter amplifier 24 is applied to the limit amplifier 26. The limit amplifier 26 functions to limit voltage to a rectangular or square wave voltage of constant amplitude and applies such rectangular voltage back to the input of the filter amplifier 23 via the voltage divider 27. The voltage divider 27 functions as a calibration voltage divider. The limit amplifier 26 is thus connected in a feedback path between the output and the input of the filter amplifiers 23 and 24. The filter amplifiers 23 and 24 thus oscillate about a common central frequency. The voltage divider 27 functions to divide the output voltage of the limit amplifier 26 by the amplification degree of the filter amplifiers 23 and 24.

The output voltage of the filter amplifier 24 is rectified by the rectifier 28 and is applied to the indicating circuit which indicates the direct voltage provided by said rectifier in indicators 29 and 30. The indicator 29 indicates the magnitude of the unbalance mass for the plane 609 and the indicator 30 indicates the magnitude of the unbalance mass for the plane 608. A memory or storage circuit 32 is connected between the output of the rectifier 28 and the indicator 29 and a memory or storage circuit 33 is connected between the output of said rectifier and the indicator 30. The memory 32 stores the signal which indicates the magnitude of the unbalance mass for the plane 609 and the memory 33 stores the signal which indicates the magnitude of the unbalance mass for the plane 608.

The stroboscope lamp 35 is electrically connected to its energizing circuit 34. The energizing circuit 34 energizes or fires the stroboscope lamp 35 once in each oscillating period.

The double potentiometer 25 permits the adjustment of the filter amplifiers 23 and 24 exactly to the rotation frequency or angular velocity of the rotor. The phase shifter 36 functions to compensate for phase displacement which may occur in the integrator 10 and/or the double integrator 22. This provides a simple correlation between the stroboscopic indication and the angular position of the unbalance mass.

The indicating circuit includes a pushbutton switch 37, which in its elevated position, as shown in FIG. 1, closes an input lead from the output of the rectifier 28 to the input of the memory 33. In its depressed position, the switch 37 provides an electrical connection between a DC source of +24 volts and the input to the memory 32, thereby bypassing the switch 17, and an electrical connection between the output of the rotary speed determining circuit 38 and the input to the memory 33. The pushbutton switch 37 may be operated by an electromagnetic control, rather than manually, to reach its depressed position. In its depressed position, the switch 37 causes the indicator 29 to provide an indication of the amplification of the filter amplifiers 23 and 24. As hereinbefore mentioned, such amplification may be varied by the potentiometer 31. The angular velocity, which is determined by the rotary speed determining circuit 38, and which is the angular velocity to which the filter amplifiers 23 and 24 are adjusted, is indicated by the indicator 30 when the switch 37 is in its depressed position.

The unbalance alternating voltages which are applied by the transducers 3 and 4 to the computer 5 are so converted in said computer that voltages at the outputs 6 and 9, as well as 7 and 8 possess the uninfluenced information of a balancing plane. These voltages are then applied, via the integrator 10, to the potentiometers 11 and 12 where they are affected in accordance with the corresponding radii. As shown in FIG. 1, the thus amplified voltage is applied, with the assistance of the switch arm 14, the attenuator 20, the adjuster 21 and the double integrator 22, via the switch arm 15 to the filter amplifiers 23 and 24. The outputs of the filter amplifiers 23 and 24 flash the stroboscopic lamp 35 via the phase shifter 36, the switch arm 16, the limit amplifier 26 and the energizing circuit 34. The alternating voltage at the output of the filter amplifiers 23 and 24 is applied via the rectifier 28, to the memory or storage circuits 32 and 33, to which the indicators 29 and 30, respectively, are connected. The memory or storage circuits 32 and 33 are controlled via the switch arm 17, is connected to a voltage source of 24 volts.

The switch 13, 14, 15, 16 and 17 are affixed to a common shaft and each of said switch arms is moved to its position K in order to tune the average or median frequency to the rotation frequency of the rotor 604, of the filter amplifiers 23 and 24 to the frequency of rotation of a rotor 604. This produces a feedback between the output of the filter amplifiers 23 and 24 and the input of said filter amplifiers via the limit amplifier 26, the voltage divider 27 and the switch arm 15. Furthermore, the stroboscopic lamp 35 is connected to the output of the limit amplifier 26 via the energizing circuit 34, and lights up in rhythm with the median frequency, adjusted at the double potentiometer 25. As long as the mark on the rotating rotor 604 does not appear to stand still, the median frequency of the filter amplifiers 23 and 24 is regulated or reset at the double potentiometer 25, until such time as said mark appears to stand still on said rotor.

The balancing machine of FIG. 1 is also able to indicate the degree of amplification of the filter amplifiers 23 and 24, but only when each of the switch arms is in its position K. To accomplish this, the pushbutton switch 37 is depressed so that the contacts 61 and 62 are electrically connected and the contacts 64 and 65 are electrically connected and the magnitude of the AC output voltage is indicated by the indicator 29 via the rectifier 28 and the memory or storage circuit 32. If the indicated magnitude of the AC output voltage does not coincide with the datum value, the potentiometer 31 of the filter amplifiers 23 and 24, is adjusted or regulated until said datum value is obtained. In the depressed position of the pushbutton switch 37, the speed to which the filter amplifiers 23 and 24 are adjusted is indicated by the indicator 30 via the rotary speed determining circuit 38, which measures the rotary speed, and the memory or storage circuit 33.

When the switch arm 17 is in its position 608, it connects the memory or storage circuit 33 to the +24 volts voltage source and when said switch arm is in position 609, it connects the memory or storage circuit 32 to said voltage source.

FIG. 2 is a schematic illustration of the balancing machine of the present invention including all reference numerals needed for conversion. The rotor 604 is stored in the two bearing stands 601 and 600 of the balancing machine 603. The right bearing plane is indicated as 606, the forces in said bearing plane are $F_{L2}$ and the corresponding voltages are $U_{L2}$. The right balancing plane is 608, the forces therein are $F_{A2}$ and the corresponding voltages are $U_{A2}$. The left bearing plane is indicated as 607, and the forces and voltages therein are $F_{L1}$ and $U_{L1}$, respectively. The left balancing plane is 609, and the forces and voltages therein are $F_{A1}$ and $U_{A1}$.

The distance between the left bearing plane 607 and the left balancing plane 609 is denoted as $a$, the distance between the left balancing plane 609 and the right balancing plane 608 is denoted as $b$, and the distance between the right balancing plane 608 and the right bearing plane 606 is indicated as $c$. The radius to which the respective mass is to be applied in the left balancing plane is indicated as $r_1$ and in the right balancing plane as $r_2$. It is possible for the balancing planes 609 and 608 to be positioned outside the bearing planes 607 and 606, for example, in a so-called "flying balance." The transducers 3 and 4 on the bearing stands 601 and 600 convert the forces which occur due to unbalance into corresponding voltages which are supplied to the computer 5.

The following equations apply for the separation of the planes.

$$U_{A1} = [(U_{L1})(a/b) - (U_{L2})(c/b)] + U_{L1} \quad (1)$$
$$-U_{A2} = [(U_{L1})(a/b) - (U_{L2})c/b)] - U_{L2} \quad (2)$$

Figure 3:
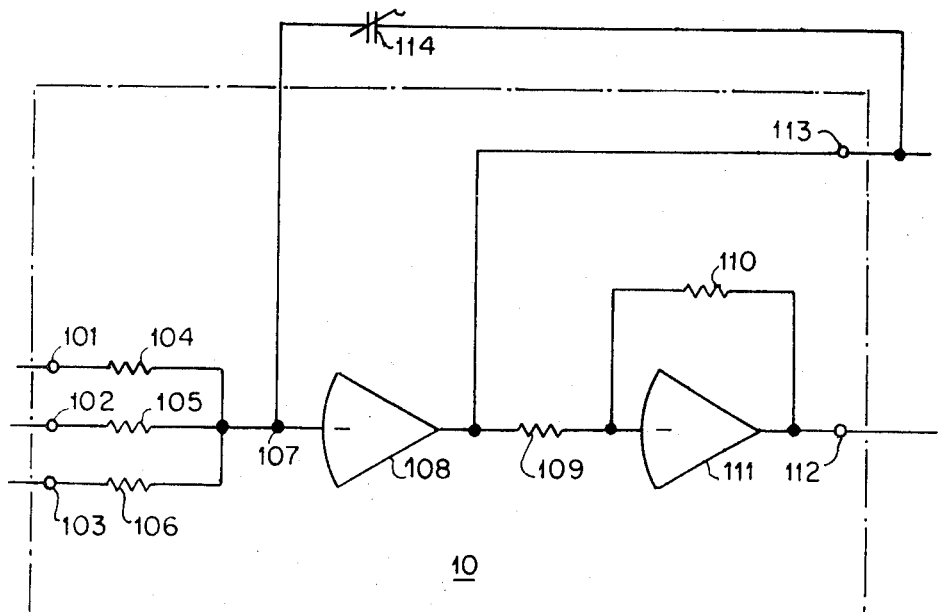
FIG. 3 is a circuit diagram of the integrator 10 of FIG. 1.

In FIG. 3, the voltages applied to the integrator 10 are applied to terminals 101, 102 and 103 and are added via resistors 104, 105 and 106 and supplied as currents at the input 107 of a computer amplifier 108. The computer amplifier 108 is a known integrator, and is connected as an integrator by a variable capacitance 114. The output voltage is provided at a terminal 113 and is also applied to a computer amplifier 111, via a resistor 109. The equal resistances of the resistor 109 and a feedback resistor 110 produce a voltage of the same magnitude, but of opposite phase at an output terminal 112.

Figure 4:
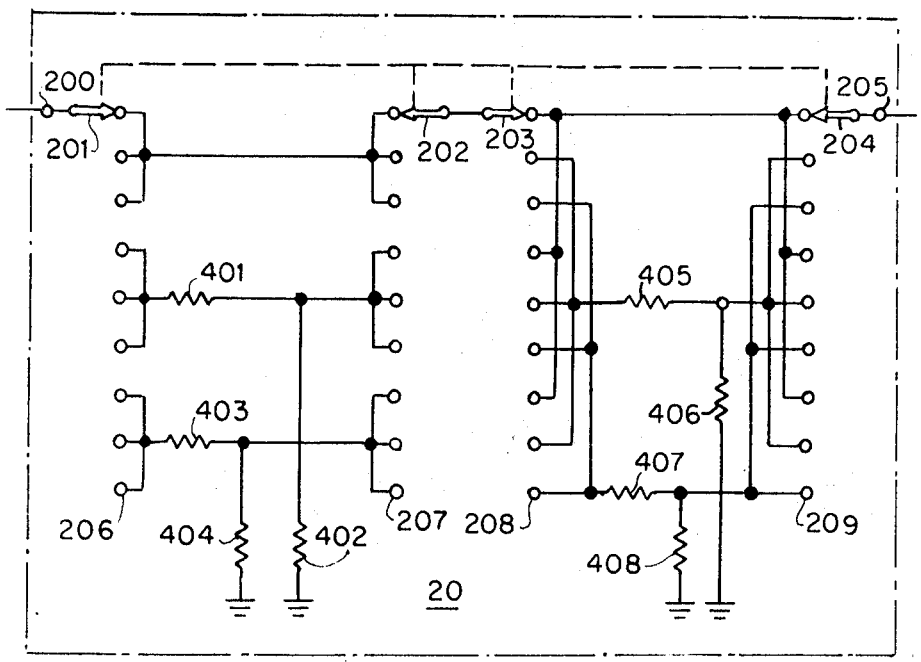
FIG. 4 is a circuit diagram of the attenuator 20 of FIG. 1.

The attenuator 20 is shown in FIG. 4. The voltage to be processed is applied to the attenuator 20, at a terminal 200. The attenuator 20 is connected after the switch 14 and provides a voltage at a terminal 205, via a switching circuit comprising switches 201, 202, 203 and 204. The voltage produced by the attenuator 20 is applied to the adjuster 21 (FIG. 1). In addition to the switches 201, 202, 203 and 204, there are additional groups of contacts 206, 207, 208 and 209 which in cooperation with resistors 401, 402, 403, 404, 405, 406, 407 and 408 permit the division of the voltage at the output terminal 205 under specific conditions. Due to this fact, the sensitivity required for further processing is adjustable for the entire measuring device.

Figure 5:
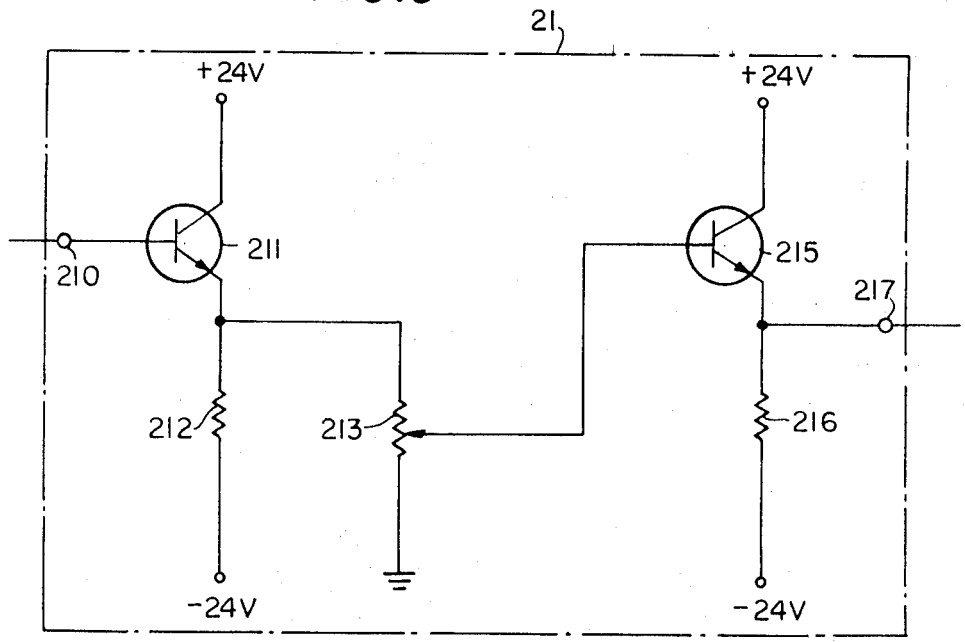
FIG. 5 is a circuit diagram of the adjuster 21 of FIG. 1.

The proper voltage at the terminal 205 is applied via a terminal 210 to the adjuster 21. The circuit of the adjuster 21 is shown in FIG. 5. Voltage is applied to an adjusting potentiometer 213, via the input terminal 210 and an emitter follower 211, 212. The emitter follower 211, 212 functions to prevent the loading of the attenuator 20 by the adjusting potentiometer 213. An emitter follower 215, 216 is connected to the output of the adjusting potentiometer 213 and functions to provide impedance matching at a terminal 217. The double integrator 22 (FIG. 1) is connected to the output of the emitter follower 215, 216. The adjusting potentiometer 213 serves to adjust or adapt the entire measuring device to the balancing machine being used. The terminals indicated as +24 V and −24 V are the voltage supply of the individual circuits.

Figure 6:
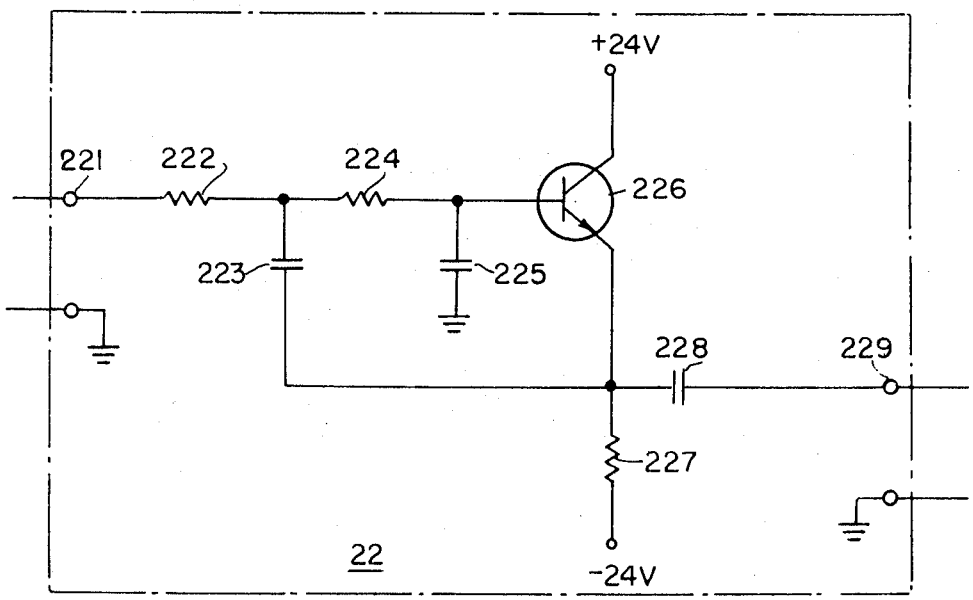
FIG. 6 is a circuit diagram of the double integrator 22 of FIG. 1.

FIG. 6 discloses the circuit of the double integrator 22. The output voltage at the terminal 217 of the adjuster 21 is applied to the double integrator 22 via an input terminal 221 and is applied via RC components 222 and 223 or 224 and 225 to an emitter follower 226, 227. The output voltage of the double integrator 22 is provided at an output terminal 229 via a coupling capacitor 228, which is connected to the output of the emitter follower 226, 227. This produces the required division by $n^2$, so that the signal for the unbalance mass $m_u$ is provided at the output terminal 229.

Figure 7:
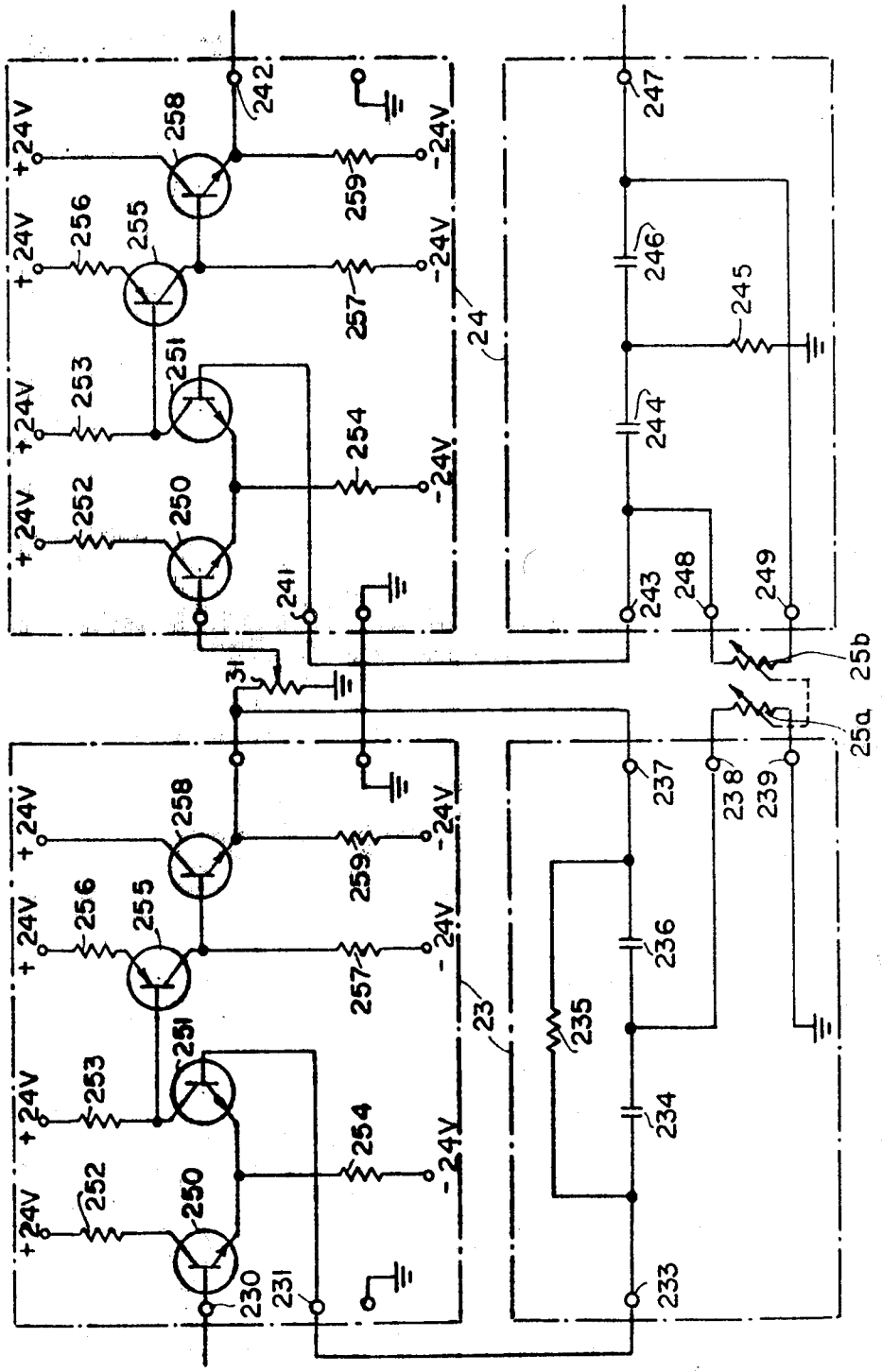
FIG. 7 is a circuit diagram of the filter amplifiers 23 and 24 of FIG. 1.

FIG. 7 shows the circuits of the filter amplifiers 23 and 24, including the double potentiometer 25 and the potentiometer 31. The voltage provided via the switch 15 (FIG. 1) is applied to an input terminal 230 of the filter amplifier 23 and is then applied via a difference amplifier stage 250, 251, 252, 253 and 254 to another amplifier stage 255, 256 and 257. The amplified voltage is provided via an emitter follower 258, 259 at an output terminal 232 of the filter amplifier 23 and is simultaneously applied to the potentiometer 31 (FIG. 1) and to an input terminal 237 of the corresponding filter.

The voltage applied at the input terminal 237 is filtered via capacitors 236 and 234 and resistors 25a and 235. The filtered voltage is applied via an output terminal 233 of the filter, in negative feedback, to an input terminal 231, and thus to the difference amplifier stage 250 to 254. The amplified voltage at the output terminal 232 of the filter amplifier 23 is applied to the filter amplifier 24 via the potentiometer 31 (FIG. 1). The voltage is applied to an input terminal 240 of the filter amplifier 24, and via a difference amplifier stage corresponding to the difference amplifier stage 250, 251, 252, 253 and 254 of the filter amplifier 23, an amplifier stage corresponding to the amplifier stage 255, 256 and 257, and an emitter follower corresponding to the emitter follower 258 and 259, to an output terminal 242 of the filter amplifier 24.

To enable the selection of the frequency of the output voltage at the output terminal 242, said output voltage is simultaneously applied to a corresponding filter. The voltage is applied via an input terminal 247, adjacent capacitors 26 and 244, a variable resistor 25b, and a resistor 245, to an output terminal 243 of the filter. The filtered voltage is applied, as previously described, to the difference amplifier stage 250 to 254 of the filter amplifier 24 in negative feedback. The amplified voltage at the output terminal 242 of the filter amplifier 24, which contains information regarding the magnitude and angle position of the unbalance in each plane, is applied to the rectifier 28 (FIG. 1), the phase shifter 36 (FIG. 1) and the contact K of the switch 16.

Figure 8:
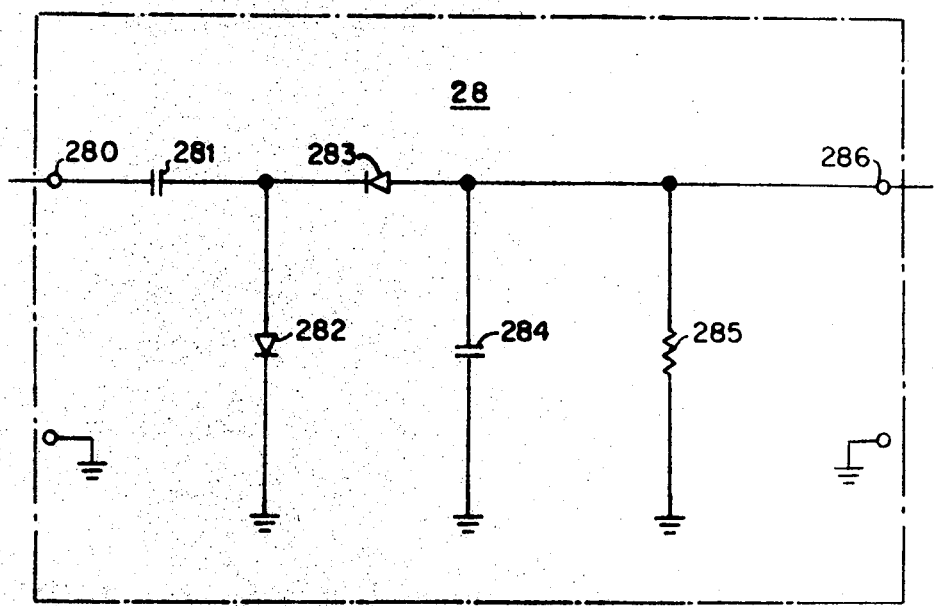
FIG. 8 is a circuit diagram of the rectifier 28 of FIG. 1.

FIG. 8 shows the circuit of the rectifier 28. The rectifier 28, in cooperation with the memories 32 and 33, effects the indication of the unbalance magnitude on the indicators or indicating instruments 29 and 30 (FIG. 1). The voltage applied to an input terminal 280 of the rectifier 28 is full-wave rectified via a capacitor 281, rectifiers 282 and 283 and a capacitor 284 and is applied to an output terminal 286 of said rectifier. A resistor 285 constitutes a defined load resistance for the entire rectifier 28.

Figure 9:
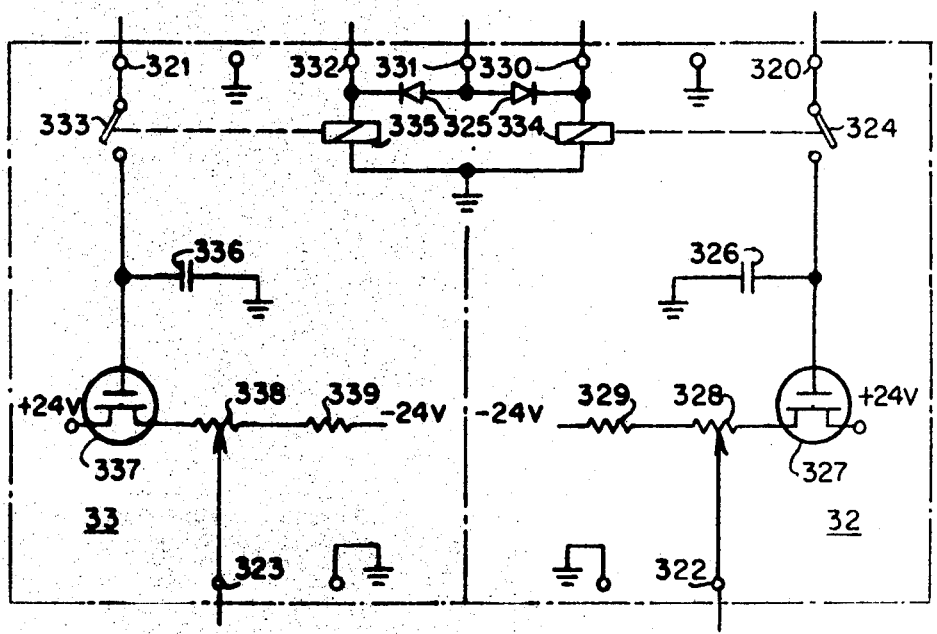
FIG. 9 is a circuit diagram of the memories 32 and 33 of FIG. 1.

The voltage at the output terminal 286 contains information about the magnitude of the unbalance, and is simultaneously applied via the elevated pushbutton switch 37 (FIG. 1) to an input terminal 321 to the memory 33 and directly via an input terminal 320 to the memory 32. As shown in FIG. 1, the switch 17 applies the +24 volt control voltage to the contact corresponding to the plane 609. This causes the control voltage, as shown in FIG. 9, to be applied to a terminal 330 of the memory 32 and energizes a relay 334.

When the relay 334 is energized, it closes a contact 324 thereof. This charges a capacitor 326 to the voltage at the terminal 320. This voltage corresponds to the magnitude of unbalance in the plane 609. An emitter follower 327, 328 and 329 is connected to the output of the capacitor 326. The emitter follower preferably includes a field effect transistor 327, and applies the voltage stored in the capacitor 326, via an output terminal 322, to the indicator 29 (FIG. 1). The field effect transistor 327 functions to energize the indicator device 29 of FIG. 1 without discharging the capacitor 326. The potentiometer 328 adjusts the zero point of the indicator 29.

If the switch 17 is in electrical contact with the contact corresponding to the plane 608, the +24 volt control voltage is applied to an input terminal 332 of the memory 33 (FIG. 1). This energizes a relay 335. When the relay 335 is energized, it closes a contact 333 thereof and the voltage applied to the input terminal 321 of the memory 33 charges a capacitor 336. When the switch 17 is in electrical contact with the contact corresponding to the plane 608, the relay 334 is deenergized and thereby opens the contact 324. The voltage stored in the capacitor 326 is thus maintained and continues to be indicated in the indicator 29 of FIG. 1.

The information stored in the capacitor 336 is then applied, in the same manner as described for the memory 32, to the indicator 30 of FIG. 1 via an emitter follower comprising a field effect transistor 337, a potentiometer 338 and a resistor 339, and an output terminal 323, so that the magnitude of the unbalance for the plane 608 is indicated in said indicator.

When the switch 17 is in its neutral position K (FIG. 1), the relay 335 is deenergized and the contact 333 is opened. As previously described, the information stored in the capacitor 336 continues to be applied to the indicator 30 of FIG. 1, so that the magnitude of unbalance remains recorded in said indicator.

When the switch 17 is in its neutral position K (FIG. 1), the switches 13, 14, 15 and 16 (FIG. 1) are mechanically moved to their neutral position K, since they are mechanically coupled to each other. The unbalance values which correspond to the unbalance values in the respective plane continue to be recorded in the indicators 29 and 30 (FIG. 1).

If the amplification of the filter amplifiers 23 and 24 is to be controlled, and/or if the rotary speed to which said filter amplifiers 23, 24 are adjusted is to be indicated, the pushbutton switch 37 (FIG. 1) is depressed. This electrically connects contacts 61 and 62 by means of contact member 60 and contacts 64 and 65 by means of contact member 63, while contacts 66 and 67 are electrically disconnected (FIG. 1). In the event of the above-mentioned control of the filter amplifiers 23 and 24, a voltage is applied to the input 230 of the filter amplifier 23, by the calibrating voltage divider 27 (FIG. 1) via the contact K of the switch 15. The voltage derived from the voltage divider 27 is amplified in the filter amplifiers 23 and 24, as previously described, and is provided at the output terminal 242 of the filter amplifier 24. The voltage at the output terminal is applied to the terminal 280 of the rectifier 28 and the rectified voltage is applied to the input terminal 320 of the memory 32, via the output terminal 286 of said rectifier.

When the contacts 66 and 67 are electrically disconnected and the contacts 64 and 65 are electrically connected by the contact member 63 in FIG. 1, the direct voltage produced by the rotary speed determining circuit 38 (FIG. 1), which is proportional to the rotary speed, is applied to the input terminal 321 of the memory 33. The contact member 60 electrically connects the contacts 61 and 62 so that the +24 volt control voltage is applied to a common input terminal 331 of the memories 33 and 32. The relays 334 and 335 are simultaneously energized by a pair of diodes 325 (FIG. 9) and close the contacts 324 and 333 so that, as previously described, the capacitor 326 is charged by the voltage at the terminal 320 and the capacitor 336 is charged by the voltage at the terminal 321 (FIG. 9). The indicator 29 indicates the amplified and rectified voltage and the indicator 30 indicates the voltage of the rotary speed determining circuit 38, which voltage is proportional to the rotary speed.

Figure 10:
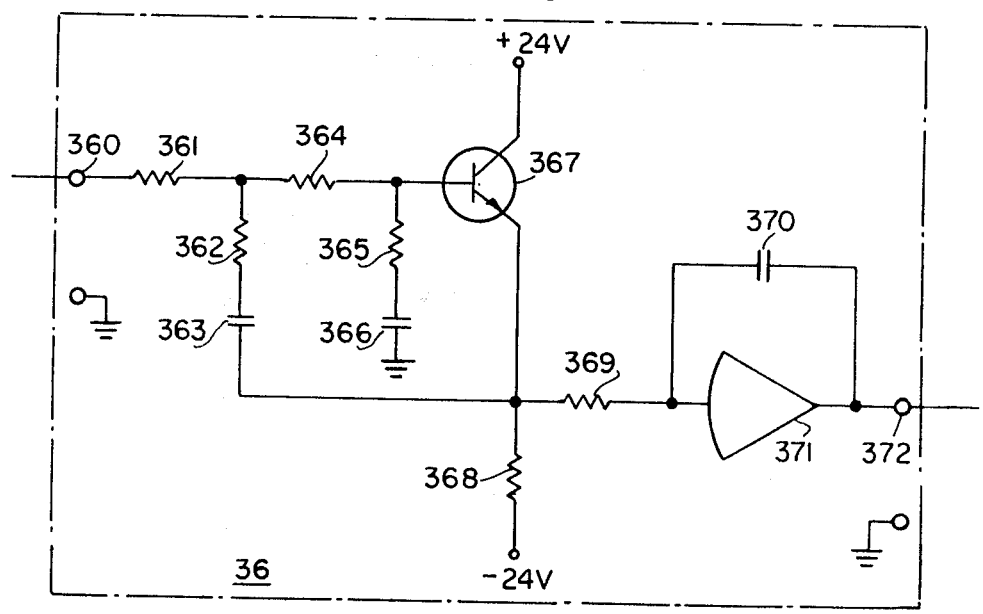
FIG. 10 is circuit diagram of the phase shifter 36 of FIG. 1.

FIG. 10 shows the phase shifter 36, which takes into account the phase displacement occurring in the integrators so that there is a simple coordination between the number in the stroboscope light and the position of the unbalance mass. The amplified voltage at the terminal 242 of FIG. 7, with respect to angular position, is applied to an input terminal 360 of the phase shifter 36 (FIG. 10). The voltage also includes the errors of an uncompleted phase rotation by 180°, errors which are unavoidable due to double integration in the double integrator 22 (FIG. 1). Due to RC components 361, 362, 363, 364, 365 and 366 and the emitter follower 367, 368, the complete rotation by 180° is provided.

The voltage is rotated 90° via a computer amplifier 371, which is connected in a known manner, as an integrator, by a capacitor 371 and a resistor 369 and is thus provided at an output terminal 372 of the phase shifter 36. This results in the fact that the entire phase rotation produced by the integrator 10, the double integrator 22 and the phase shifter 36 amounts to 360°, which is the same as a rotation at 0°.

The voltage at the output terminal 372 of the phase shifter 36, which contains information concerning the angular position of the unbalance, is applied to the limit amplifier 26 via the switch 16 (FIG. 1) for balancing plane 609 and balancing plane 608. In FIG. 1, the voltage at the output terminal 372 of the phase shifter circuit 36, is applied to the limit amplifier 26 via the contact corresponding to the plane 609 of the switch 16.

Figure 11:
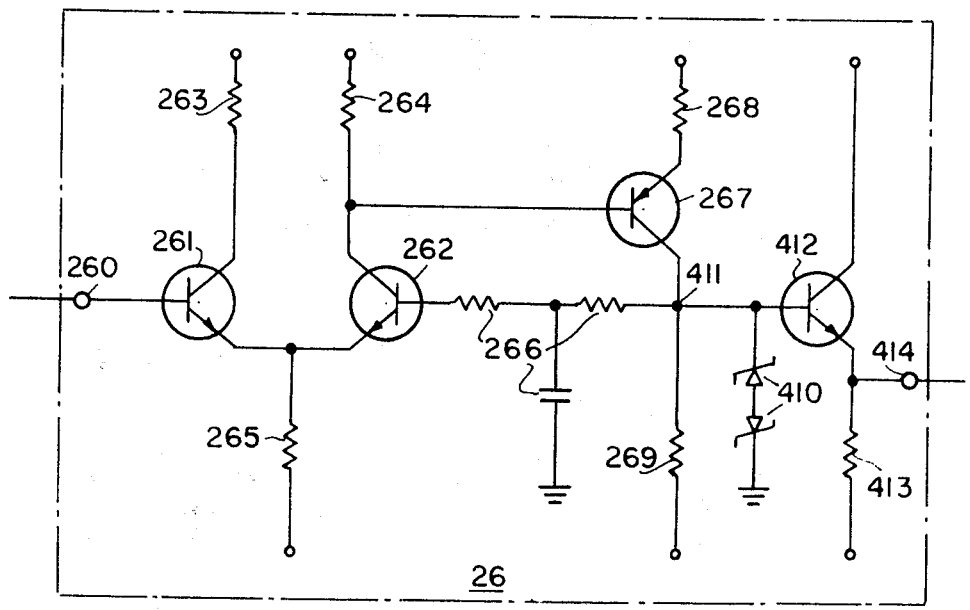
FIG. 11 is a circuit diagram of the limit amplifier 26 of FIG. 1.

FIG. 11 presents the circuit of the limit amplifier 26. The voltage at the terminal 372 of the phase shifter 36 and the amplified signal at the output terminal 242 of the filter amplifier 24 are applied to an input terminal 260 of the limit amplifier 26 (FIG. 11). The sinusoidal voltage at the input terminal 260 of the limit amplifier 26 is amplified by a difference amplifier stage 261, 262, 263, 264 and 265, and is applied to another amplifier stage 267, 268 and 269. The amplitude of the voltage is maintained constant by Zener diodes 410.

The Zener diodes 410 are connected in series with opposite polarities (FIG. 11) so that a rectangular or square wave voltage is provided via a resistor having a small resistance value at an output terminal 414 of the limit amplifier 26. The output terminal 414 is connected to the Zener diodes 410 via an emitter follower 12, 413. The transistor 262 has a negative feedback via a quadripole 266. Such feedback maintains the arithmetical average value of the voltage at a circuit point 411 at zero. The rectangular output voltage at the terminal 414 is applied to the calibrating voltage divider 27, the energizing circuit 34 and the rotary speed determining circuit 38 of FIG. 1.

Figure 12:
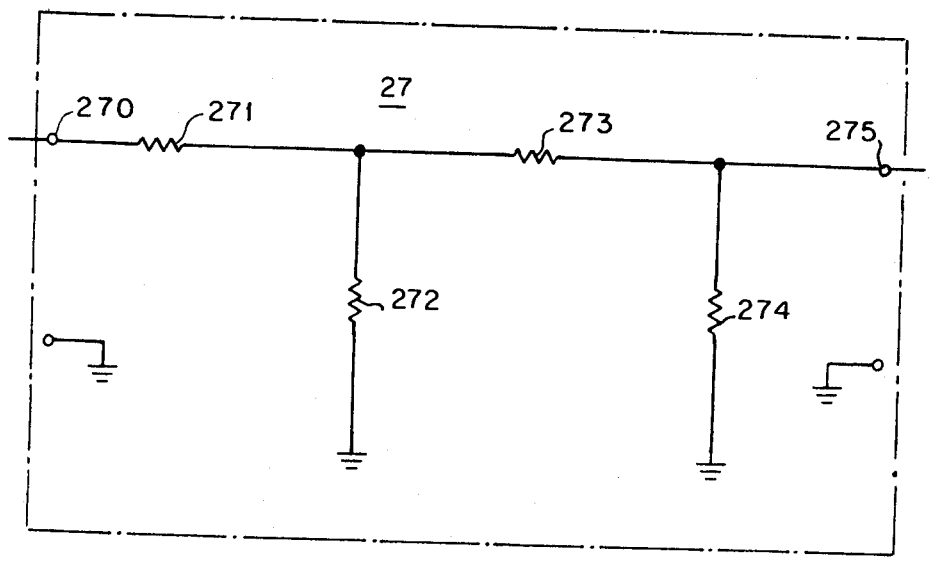
FIG. 12 is a circuit diagram of the voltage divider 27 of FIG. 1.

FIG. 12 illustrates the circuit of the voltage divider 27. The rectangular voltage applied to an input terminal 270 of the voltage divider 27 is divided by two voltage dividers 271, 272 and 273, 274, connected in sequence, at a ratio which corresponds to the reference amplification of the filter amplifiers 23 and 24. The divided voltage is provided at an output terminal 275 of the voltage divider 27.

Figure 13:
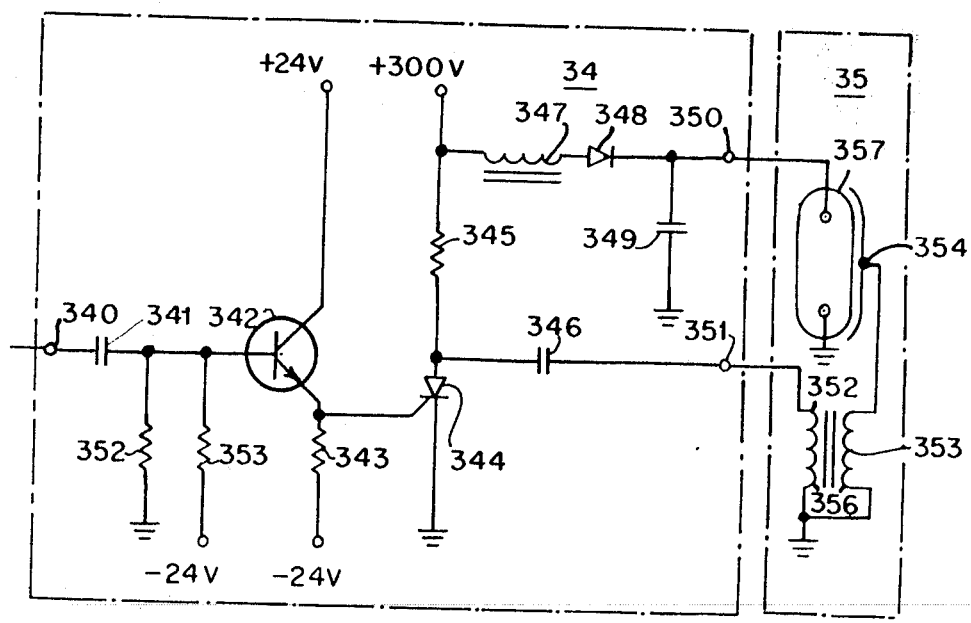
FIG. 13 is a circuit diagram of the energizing circuit 34 and the stroboscopic lamp of FIG. 1.

FIG. 13 shows the energizing circuit 34 and the stroboscopic lamp 35. The rectangular voltage from the limit amplifier 26 is applied to and input terminal 340 of the energizing circuit 34. The rectangular voltage is differentiated by a capacitor 341 and resistor 352, so that positive and negative pulses are produced. A thyristor 344 is switched to its conductive condition by the pulses via an emitter follower 342, 343. A capacitor 346 discharges via the thyristor 344 and the primary winding 382 of an energizing transformer 356.

The capacitor 346 is initially charged via the primary winding 382 of the energizing transformer 356 and a resistor 345 to a voltage of +300 volts. A capacitor 349 is charged to 300 volts via an inductor 347 and a diode 348, so that an energizing voltage is provided at an output terminal 350 of the energizing circuit 34. The energizing voltage at the output terminal 350 is applied to a flash tube 357 of the stroboscopic lamp 35.

During the discharge of the capacitor 346 via the primary winding 382 of the energizing transformer 356, a high-voltage pulse is produced in the secondary winding 383 of said transformer. The high-voltage pulse fires the flash tube 357 by means of the firing electrode 354 of said flash tube, so that the capacitor 349 discharges via the light arc produced thereby and produces a flash of light.

The two output terminals 350 and 351 of the energizing circuit 34 permit the inclusion of the energizing transformer with the stroboscopic lamp 35. The inductor 347 and the diode 348 permit the capacitor 349 to be charged to almost twice the voltage of 300 volts, or approximately 600 volts, after the initial firing of the flash lamp 357.

Figure 14:
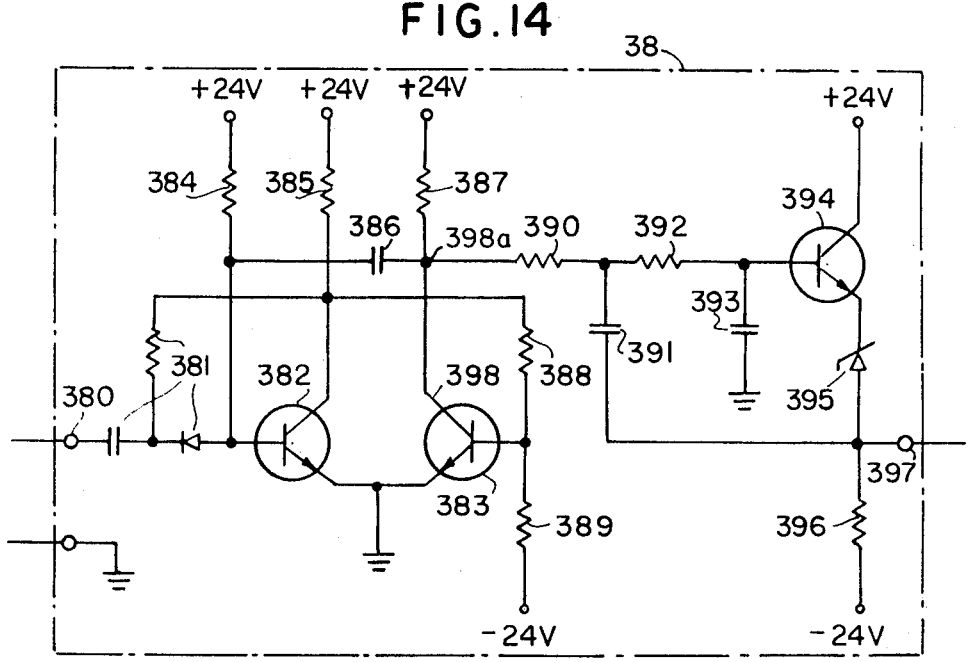
FIG. 14 is a circuit diagram of the rotary speed determining circuit 38 of FIG. 1.

The rectangular voltage provided by the limit amplifier 26 is applied to the rotary speed determining circuit 38 (FIG. 1). The rotary speed determining circuit is shown in FIG. 14. The rectangular voltage controls a known monostable multivibrator circuit which comprises transistors 382 and 383, a capacitor 386, resistors 384, 385 and 387 and resistors 388 and 389. The rectangular voltage is applied to the monostable multivibrator via a gate circuit 381. The transistor 383 includes a collector electrode 398.

The arithmetic median value of the voltage at the collector electrode 398 of the transistor 383 becomes proportional to the frequency of the control voltage applied at an input terminal 380, but the voltage includes in addition the voltage at said collector electrode which adjusts itself during the stable condition of the monostable multivibrator.

The alternating voltage portions are filtered out by a filter circuit comprising RC components 390, 391, 392 and 393 and an emitter follower 394, 395, 396. The voltage drop at Zener diode 395 corresponds to the voltage portion at the collector electrode 398 in a stable condition of the monostable multivibrator. As a result, only the voltage which is proportional to the rotary speed is still available at an output terminal 397 of the rotary speed determining circuit 38 of FIG. 14.

Figure 15:
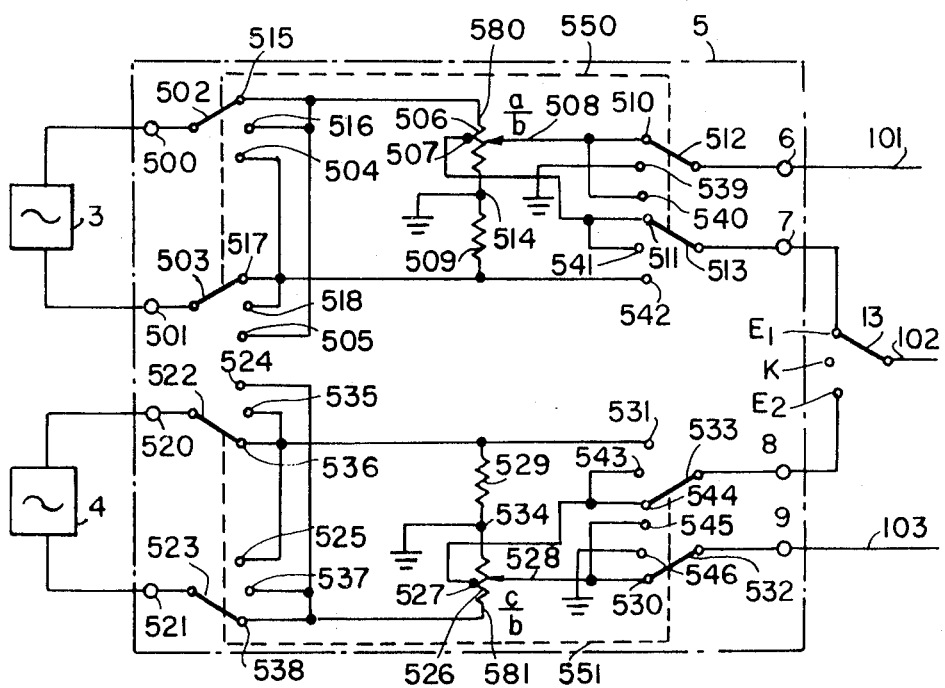
FIG. 15 is a circuit diagram of the computer 5 of FIG. 1.

FIG. 15 is a circuit of the computer 5. The computer 5 of FIG. 15 computes the plane divisions. The voltage from the transducer 3 (FIG. 1), which is proportional to the bearing force F in the left bearing plane, is applied to input terminals 500 and 501 and the voltage from the transducer 4 (FIG. 1), which is proportional to the bearing force in the right bearing plane, is applied to input terminals 520 and 521. The computer 5 provides the individual factors for the indicated equations.

To obtain arbitrary values of $a/b$ and $c/b$ such as, for example, $a/b=10$, the tenfold voltage $U_{L1}$ must be provided at a potentiometer 506, the simple voltage must be provided at fixed contact or tap 507 of said potentiometer, relative to the end contact 514 of said potentiometer, and the simple voltage $U_{L1}$ must be provided at a resistor 509, relative to said end contact. Consequently, the transducer 3 must provide the elevenfold voltage $U_{L1}$.

In the simplest design, a scale is provided at the potentiometer 506, where the quotient $a/b$ may be adjusted so that the voltage $(U_{l1})$ $(a/b)$ is provided at the movable contact or tap 508 of said potentiometer, relative to the end contact or zero point 514. This voltage at the terminal 6 of the computer 5 for plane separation (FIGS. 1 and 15). The voltage at the terminal 6 is applied to the input terminal 101 of the integrator 10 (FIG. 3).

Analogously, according to the selected example, the elevenfold voltage must be provided for the voltage magnitudes supplied by the transducer 4. With respect to an end contact or zero point 534 of a potentiometer 526, the tenfold voltage across said potentiometer, the simple voltage at the fixed contact or tap 527 of said potentiometer and the simple voltage $U_{L2}$ at the resistor 529 decrease. In the simplest design, a scale to adjust the quotient $c/b$ is provided at the potentiometer 526, so that the voltage $(U_{L2})(c/b)$ is provided at the movable contact or tap 528 of said potentiometer, relative to the end contact or zero point 534 of said potentiometer. This voltage is provided at the output terminal 9 of the computer 5 for plane separation (FIGS. 1 and 15). The voltage at the terminal 9 is applied to the input terminal 103 of the integrator 10 (FIG. 3).

A plurality of contact or switch arms 502, 503, 512 and 513 are mechanically coupled to each other and function as a switch 550. Another plurality of contact or switch arms 522, 523, 532 and 533 are mechanically coupled to each other and function as a switch 551. The switches 550 and 551 permit a determination of the position of the balancing plane relative to the corresponding bearing plane.

In the switch positions shown in FIG. 15, the voltage $U_{L1}$ at the fixed tap 507 of the potentiometer 506 is applied via a contact 511 to the output terminal 7 of the computer 5 for plane separation (FIGS. 1 and 15). The voltage $U_{L2}$ at the fixed tap 527 of the potentiometer 526 is applied to the output terminal 8 of the computer 5 for plane separation (FIGS. 1 and 15). The positions of the switches 550 and 551 in FIG. 15 correspond to the selected balancing planes illustrated in FIG. 2.

If the balancing plane 609 is positioned on the other side of the bearing plane 607, the switch 550 must be moved, for example, to its position in electrical contact with the contacts 504, 505, 540 and 542. If the bearing plane 607 is also the balancing plane 609, the switch 550 must be moved to its position in electrical contact with the contacts 516, 518, 539 and 541. The same applies to the switch 551. This permits any position of the balancing plane to be determined by the computer 5, so that the outputs of said computer provide the proper components of the aforementioned equations.

The output terminal 6 thus provides the voltage $(U_{L1})$ $(a/b)$, the output terminal 7 provides the voltages $U_{L1}$, the output terminal 8 provides the voltage $U_{L2}$ and the output terminal 9 provides the voltage $(U_{L2})$ $(c/b)$, with the polarities indicated in the equations. The voltages $(U_{L1})$ $(a/b)$ and the voltage $(U_{L2})$ $(c/b)$ are required to resolve equation (1) and equation (2). These voltages are therefore continuously applied to the input terminals 101 and 103 of the integrator 10 (FIG 3). The voltage $U_{L1}$ for the left balancing plane is selectively applied via the contact representing the plane 609 to the integrator 10 input terminal 102 and the voltage $U_{L2}$ for the right balancing plane is selectively applied via the contact representing the plane 608 to the input terminal 102 of the said integrator, when the switch 13 of FIG. 1 operates.

Figure 16:
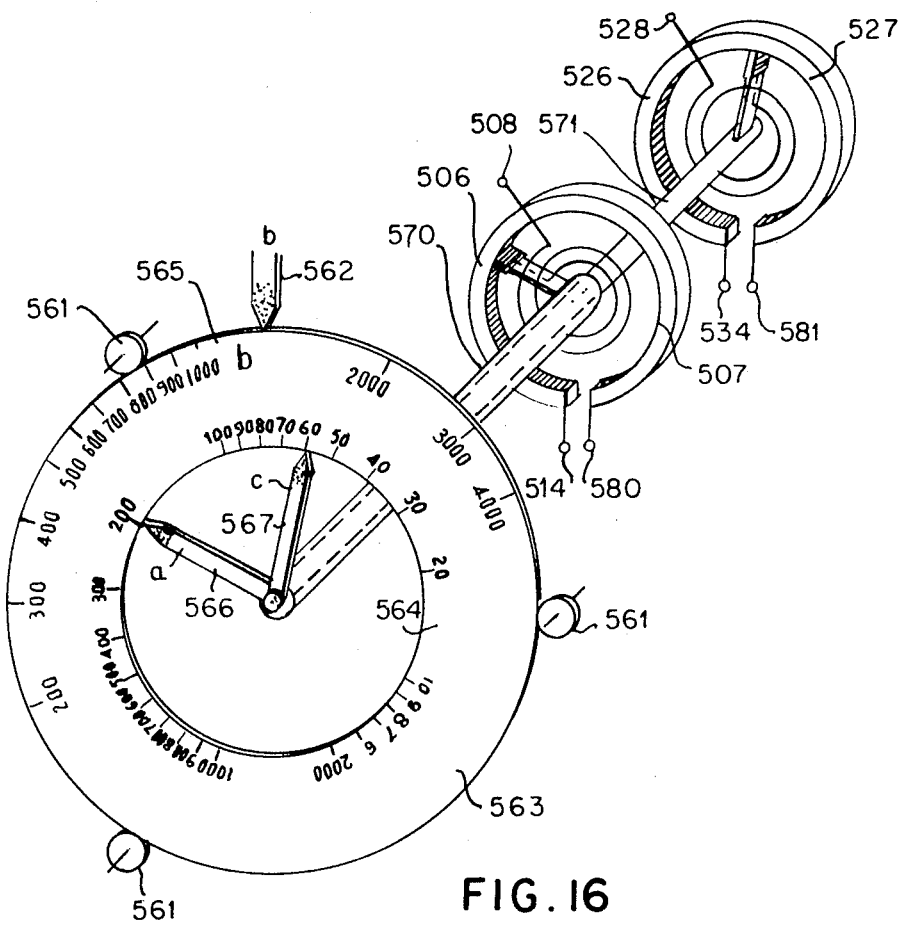
FIG. 16 is a perspective schematic diagram of parts of the computer of FIG. 15.

FIG. 16 disclosed a preferred embodiment of a scale for the potentiometer 506 and for the potentiometer 526 of FIG. 15. If the potentiometers 506 and 526 are logarithmic or exponential potentiometers, the quotients $a/b$ and $c/b$ may be determined in a very simple manner. To accomplish this, a computer ring 563 is provided at its outer front face with scale indications which correspond to the distance $b$ (FIG. 2). The inner front face of the ring 563 is provided with scale indications which correspond to the distances $a$ and $c$ (FIG. 2).

The ring 563 corresponds to the bar of a conventional slide rule and is pivoted in bearings 561. When the ring 563 is adjusted to the number corresponding to the distance $b$, below a fixed $b$ value at a mark 562, the quotient may be provided as a subtraction or difference when exponential potentiometers are used. Adjustment of the indicator 567 to a value $c$ adjusts the tap 528 of the potentiometer 526 to correspond with the value $c/b$ (FIG. 15). In an analogous manner, if an indicator 566 is adjusted to the value $a$, the tap 508 of the potentiometer 506 is adjusted to the value $a/b$ (FIG. 15). FIG. 16 illustrates the end contact 514, the end contact 580, the end contact 534, the end contact 581, the movable contact 507 and the movable contact 527 of the potentiometers 506 and 526 of FIG. 15. The indicator 566 is supported on a hollow shaft 570 and the indicator 567 is supported on a shaft 571 which is coaxially mounted within the shaft 570. The shaft 570 controls the potentiometer 506 and the shaft 571 controls the potentiometer 526.

While the invention has been described by means of a specific example, and in a specific embodiment, we do not wish to be limited thereto, for obvious modifications will occur to those skilled in the art without departing from the spirit and scope of the invention.

We claim:

1. A balancing machine for subcritical operation having a pair of spaced bearing surfaces and a mechanical-to-electrical transducer means at each of the bearing surfaces for determining the magnitude and angular position of an unbalance mass in two balancing planes in a single operation, said balancing machine comprising computer means for performing plane separation and conversion of forces sensed in said bearing surfaces to forces in correction planes, said computer means comprising logarithmic voltage divider means and logarithmic potentiometer means and having input means connected to said transducer means, and a pair of output means;

first switching means selectively coupled to one of said output means;

additional computer means for radii correction of said balancing planes, said additional computer means comprising potentiometer means and having input means coupled to the output means of the computer means via the first switching means and an integrator and also having output means;

second switching means coupled to the output means of the additional computer means;

double integrating means having an input coupled to the output means of the additional computer means via the second switching means and also having an output;

third switching means coupled to the output of the double integrating means;

filter amplifier means having an input coupled to the output of the double integrating means via the third switching means and also having an output, said filter amplifier means comprising double potentiometers for adjusting said filter amplifier means;

phase-shifting means having an input coupled to the output of said filter amplifier means, and also having an output;

fourth switching means coupled to the output of said phase-shifting means;

a limit amplifier having an input coupled to the output of the filter amplifier means via the phase-shifting means and the fourth switching means and also having an output;

an energizing circuit coupled to the output of the limit amplifier;

a stroboscopic lamp coupled to the limit amplifier via the energizing circuit;

rectifier means having an input also coupled to the output of the filter amplifier means;

a pair of memories having inputs coupled in common to the output of the filter amplifier means via the rectifier means and also having outputs;

fifth switching means connecting a voltage source to said memories for actuating said memories;

indicating means connected to the outputs of the memories; and coupling means coupling the first, second, third, fourth and fifth switching means to each other for common movement.

2. A balancing machine as claimed in claim 1, further comprising control means connected between said filter amplifier means and said indicating means for calibrating said filter amplifier means in sensitivity.

3. A balancing machine as claimed in claim 1, wherein said indicating means includes a pair of memory devices for the magnitude of the unbalance mass for two planes.

4. A balancing machine as claimed in claim 1, further comprising voltage divider means and wherein the balancing machine has a rotor having a mark thereon and wherein the first, second, third, fourth and fifth switching means are movable to a position wherein the output of the filter amplifier means is fed back to the input thereof via the limit amplifier and the voltage divider means whereby, when the mark thereon appears to move upon rotation of the rotor, the double potentiometers of the filter amplifier means are adjustable until said mark appears to be stationary.

5. A balancing machine as claimed in claim 1, wherein the logarithmic voltage divider means of said computer means has an input and an output and two circuit arrangements each having four movable switching arms each connectable to the input of the logarithmic voltage divider means and two additional movable switching arms coupling the output of the logarithmic voltage divider means to an electrical conductor, the logarithmic voltage divider means comprising an adjustable voltage divider having a logarithmic function and a fixed resistance.

6. A balancing machine as claimed in claim 1, further comprising integrating means included in said additional computer means for eliminating the frequency dependence of the mechanical-to-electrical transducer means when said transducer means are of oscillation velocity type, said double integrating means being capable of further eliminating the frequency dependence of said transducer means, and wherein said filter amplifier means is coupled to said additional computer means via aid double integrating means thereby accounting for the quardratic dependence of the centrifugal force on the angular velocity so that the unbalance indication of said indication means is independent of the angular velocity.

7. A balancing machine as claimed in claim 6, wherein said phase-shifting means are connected between said filter amplifier means and said stroboscopic means for compensating for phase displacement occurring in said integrating means and said double integrating means.

* * * * *